US010346390B2

(12) United States Patent
Goldberg et al.

(10) Patent No.: US 10,346,390 B2
(45) Date of Patent: Jul. 9, 2019

(54) OPPORTUNISTIC MITIGATION FOR CORRUPTED DEDUPLICATED DATA

(71) Applicant: INTERNATIONAL BUSINESS MACHINES CORPORATION, Armonk, NY (US)

(72) Inventors: Itzhack Goldberg, Hadera (IL); Erik Rueger, Ockenheim (DE); Christof Schmitt, Ketsch (DE); Neil Sondhi, Pilisborosjeno (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 15/161,704

(22) Filed: May 23, 2016

(65) Prior Publication Data
US 2017/0337239 A1 Nov. 23, 2017

(51) Int. Cl.
G06F 16/23 (2019.01)
G06F 16/2455 (2019.01)

(52) U.S. Cl.
CPC .... *G06F 16/2365* (2019.01); *G06F 16/24556* (2019.01); *G06F 16/24568* (2019.01)

(58) Field of Classification Search
None
See application file for complete search history.

(56) References Cited

U.S. PATENT DOCUMENTS

| 6,260,156 | B1* | 7/2001 | Garvin | G06F 12/0246 360/48 |
| 8,407,191 | B1 | 3/2013 | Nanda | |
| 8,515,909 | B2* | 8/2013 | Anglin | G06F 17/30371 707/637 |
| 8,645,334 | B2* | 2/2014 | Leppard | G06F 11/004 707/692 |
| 8,930,648 | B1* | 1/2015 | Storer | G06F 12/0292 711/154 |
| 9,037,856 | B2 | 5/2015 | Bestler et al. | |
| 9,195,692 | B2 | 11/2015 | Watanabe et al. | |
| 9,268,783 | B1 | 2/2016 | Shilane et al. | |
| 2006/0126472 | A1* | 6/2006 | Hwang | G11B 20/1217 369/53.17 |
| 2010/0031086 | A1* | 2/2010 | Leppard | G06F 11/1662 714/15 |
| 2013/0067270 | A1* | 3/2013 | Lee | G06F 11/1004 714/6.1 |
| 2013/0238571 | A1 | 9/2013 | Bates et al. | |
| 2015/0088839 | A1 | 3/2015 | Jones | |

(Continued)

OTHER PUBLICATIONS

Kaiser et al., "Design of an Exact Data Deduplication Cluster," IEEE 28th Symposium on Mass Storage Systems and Technologies, Apr. 16-20, 2012 (12 pages).

(Continued)

*Primary Examiner* — Yuk Ting Choi
(74) *Attorney, Agent, or Firm* — Griffiths & Seaton PLLC

(57) ABSTRACT

Various embodiments for managing data integrity in a data deduplication system in a computing storage environment, by a processor device, are provided. In one embodiment, a method comprises, in a data deduplication system using a data scrubber process, overwriting a stored data chunk declared as corrupted with an identical fresh data chunk discovered in an incoming data stream.

6 Claims, 4 Drawing Sheets

(56) References Cited

U.S. PATENT DOCUMENTS

2015/0324419 A1 11/2015 Aronovich
2016/0012098 A1 1/2016 Li et al.
2016/0013815 A1* 1/2016 Wideman ............ H03M 13/373
                                                    714/766

OTHER PUBLICATIONS

Rozier et al., "Modeling the Fault Tolerance Consequences of Deduplication," 30th IEEE International Symposium on Reliable Distributed Systems, Oct. 4-7, 2011 (10 pages).

* cited by examiner

OPPORTUNISTIC MITIGATION FOR CORRUPTED DEDUPLICATED DATA

BACKGROUND OF THE INVENTION

Field of the Invention

The present invention relates in general computing systems, and more particularly to various embodiments for managing data integrity in data deduplication systems in computing storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components.

Often times when writing to even the smallest environment, single drives, duplicate data is written. These duplicated contents can then be DE-duplicated using standard deduplication techniques so long as specific metrics are met.

SUMMARY OF THE INVENTION

Various embodiments for managing data integrity in a data deduplication system in a computing storage environment, by a processor device, are provided. In one embodiment, a method comprises, in a data deduplication system using a data scrubber process, overwriting a stored data chunk declared as corrupted with an identical fresh data chunk discovered in an incoming data stream.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
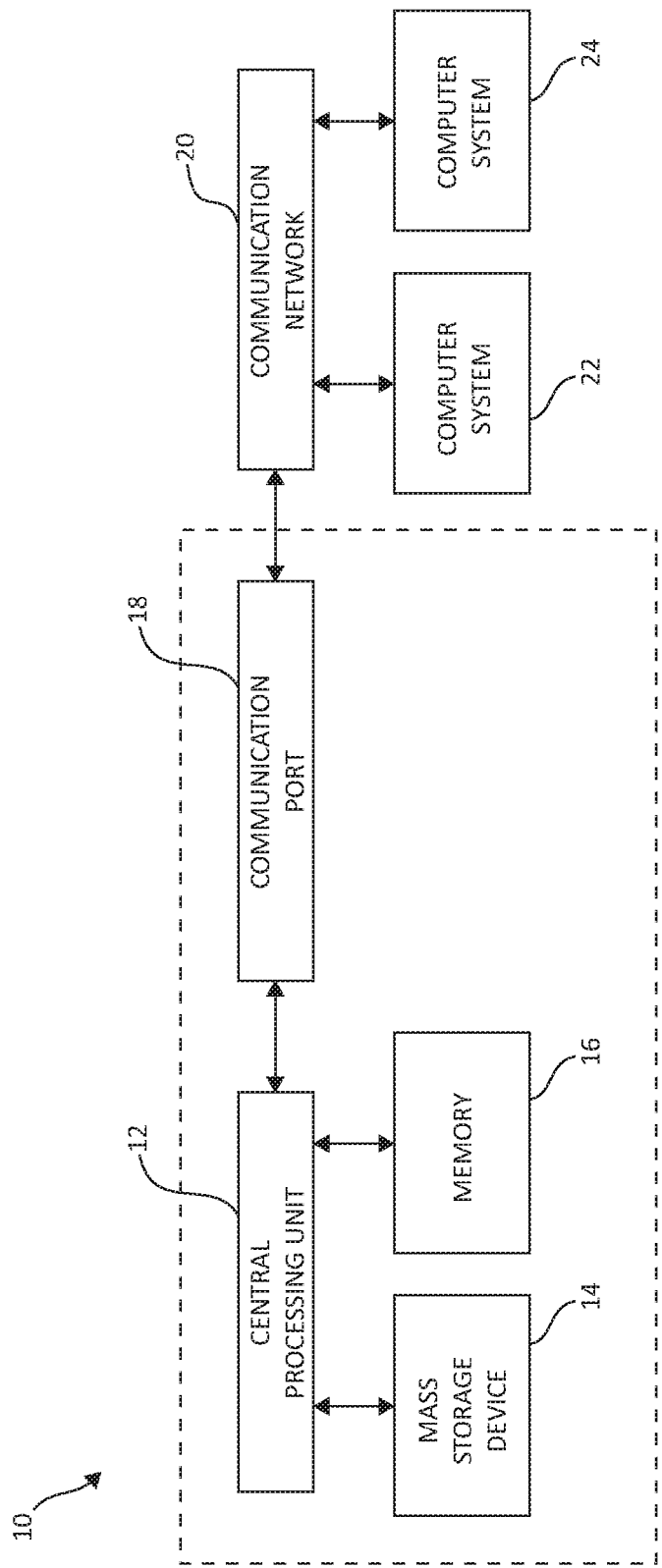
FIG. 1 is a block diagram illustrating a computer storage environment in which aspects of the present invention may be realized.

Described embodiments, and illustrative Figures of various embodiments for managing data integrity in a data deduplication system, in a computing storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20 (or even greater), times the original storage capacity. In other words, the same user, with the benefit of deduplication technology, essentially has the capacity of ten storage units where the user originally had one, without any additional space or power requirements.

However, data deduplication systems may themselves cause challenges. For example, the prospect of having a corrupted deduplicated data is considered to be more serious than finding corrupted data in an un-deduplicated environment because the corrupted data can impact many files and instances. Some methods have been proposed to handle this issue, however, often do not head the corrupted data off at its source.

In view of the foregoing, the mechanisms of the illustrated embodiments provide various solutions to mitigating corrupted data within data deduplication systems. These mechanisms include such functionality as overwriting corrupted data chunks with discovered identical fresh chunks incoming into the deduplication system, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning first to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
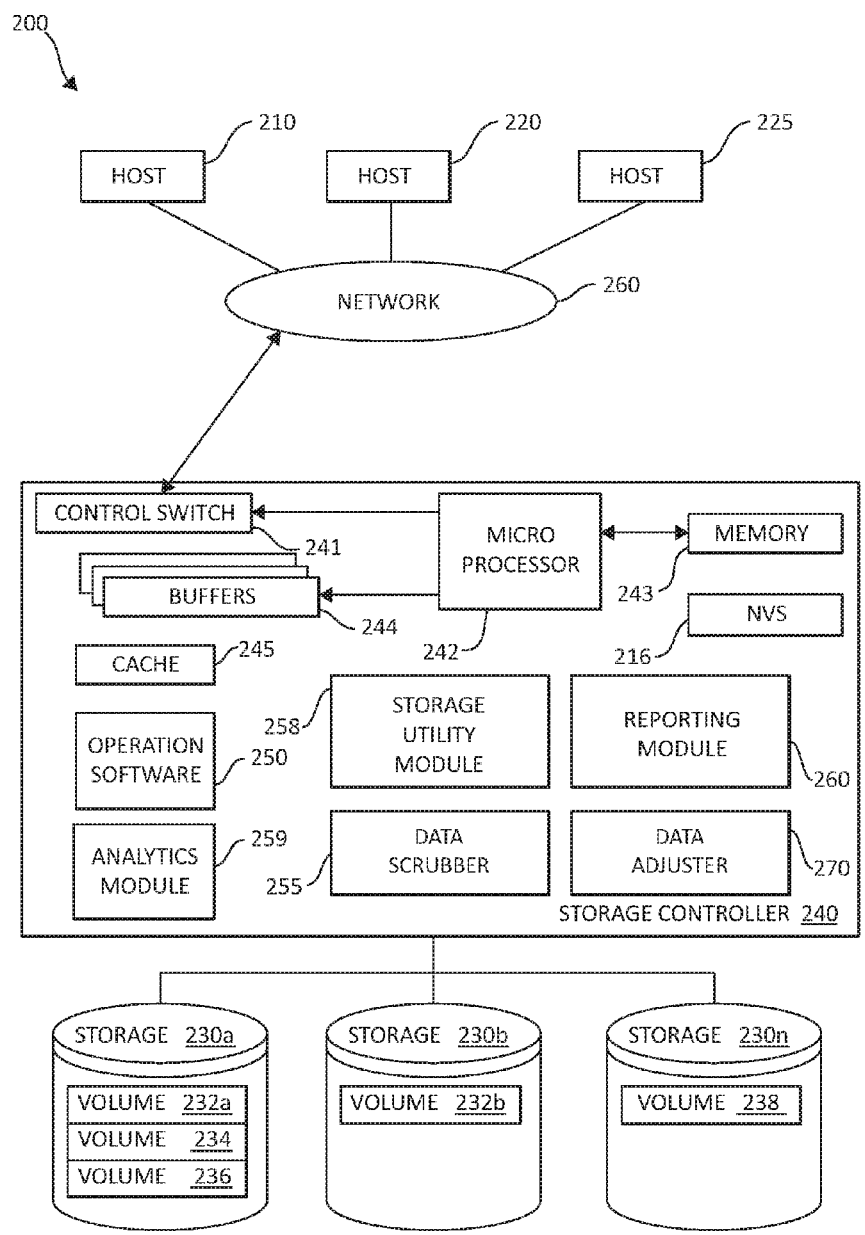
FIG. 2 is a block diagram illustrating a hardware structure of an exemplary data storage system in a computer system in which aspects of the present invention may be realized.

FIG. 2 is an exemplary block diagram 200 showing a hardware structure of a data storage and deduplication system that may be used in the overall context of data integrity management in data deduplication systems. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the data deduplication functionality according to aspects of the illustrated embodiments.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data scrubber module 255, a storage utilization module 258, a reporting module 260, and a data adjuster module 270. The data scrubber module 255, storage utilization module 258, reporting module 260, and the data adjuster module 270 may operate in conjunction with each and every component of the storage controller 240, the hosts 210, 220, 225, and storage devices 230. The data scrubber module 255, storage utilization module 258, reporting module 260, and the data adjuster module 270 may be structurally one complete module or may be associated and/or included with other individual modules. The data scrubber module 255, storage utilization module 258, reporting module 260, and the data adjuster module 270 may also be located in the cache 245 or other components.

The data scrubber module 255, storage utilization module 258, reporting module 260, and the data adjuster module 270 may individually and/or collectively perform various aspects of the present invention as will be further described. For example, the data scrubber module 258 may perform tracking operations and related analytics in accordance with aspects of the illustrated embodiments. The storage utilization module 258 may also utilize analytics to determine physical or virtual storage capacities in view of deduplication functionality operational on particular storage devices. The data adjuster module 270 may further utilize information gathered from the data scrubber module 255 to perform various mechanisms of the invention. Finally, reporting module 260 may notify various portions of the data storage and deduplication system 200 about such various aspects as current capacity utilization, and so forth. As one of ordinary skill in the art will appreciate, the data scrubber module 255, storage utilization module 258, reporting module 260, and the data adjuster module 270 may make up only a subset of various functional and/or functionally responsible entities in the data storage and deduplication system 200.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
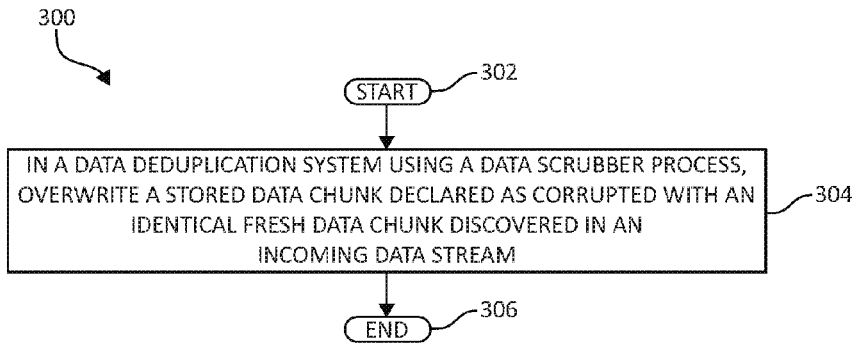
FIG. 3 is a flow chart illustrating a method for managing data integrity in a data deduplication system in accordance with aspects of the present invention.

Continuing to FIG. 3, a method 300 for managing data integrity in a data deduplication system in a computing storage environment, is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, in a data deduplication system using a data scrubber process, a stored data chunk declared as corrupted is overwritten with an identical fresh data chunk discovered in an incoming data stream (step 304). The method ends (step 306).

One of the known techniques in storage arrays to combat data inconsistencies and corruption is the usage of a scrubber process which runs as a daemon. Deduplicated storage arrays take advantage of this same methodology and a scrubber is used within the system to detect corrupted data chunks. When the scrubber finds a corrupted data chunk, it attempts to recover the corrupted data chunk through all known means. After attempting and failing to recover the data chunk, it could, depending on configuration, delay the "declaration" of the respective data as corrupted for a later time, such as when there is an attempt to actually read the given data. This strategy, however, does nothing to solve the underlying problem, as if the corrupted chunk status is not verified before a read, there may be no plausible course of corrective action.

Instead, the mechanisms of the present invention provide an opportunistic mitigation method to detect and overwrite corrupted data found by the data scrubber process continuously. Upon initiation and identifying a corrupted data chunk, the data scrubber immediately marks its respective hash value as pointing to a known corrupted chunk and the data chunk is placed on a corrupted chunk list. Marking the data chunk as such allows users to read all currently healthy data and give room for a recovery to take course when a fresh, good identical chunk is written again to the storage. When a new data chunk arrives in an incoming data stream which bears an identical hash value to a known corrupted data chunk, the good incoming data chunk may be used to overwrite the data chunk declared as corrupted, and the existing entry of the corrupted chunk on the corrupted chunk list may be removed. Additionally, a chunk status of each known data chunk may be recorded on a managed chunk list, including information such as a chunk identification (ID), a valid/corrupt/refreshed status, etc.

Data Scrubber Process

Figure 4:
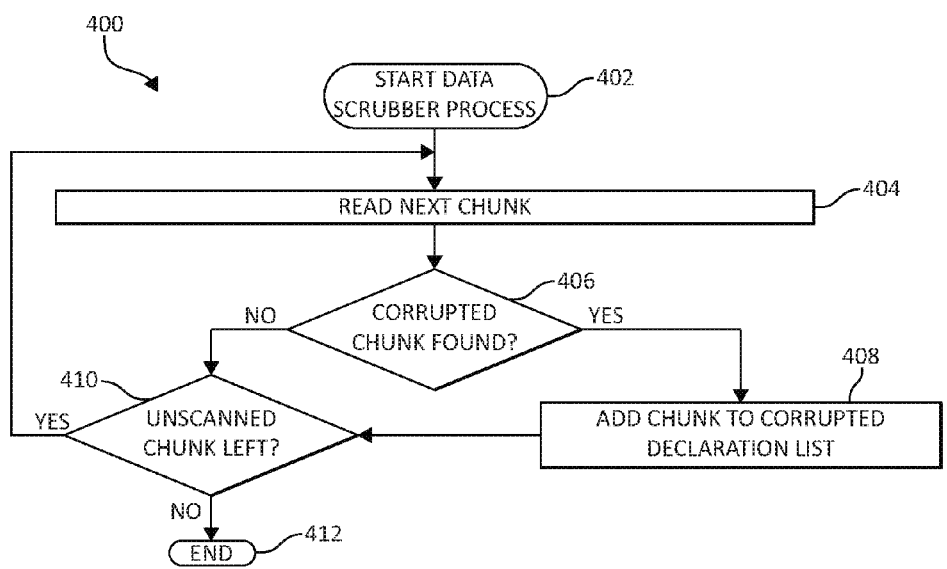
FIG. 4 is an additional flow chart illustrating a method for managing data integrity in a data deduplication system in accordance with aspects of the present invention.

Advancing to FIG. 4, a method 400 for detecting and declaring corrupted data chunks is illustrated, in accordance with one embodiment of the present invention. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Beginning, the data scrubber process is initiated (step 402), and a data chunk is scanned for inconsistencies or corruption (step 404). A determination is made at step 406 whether a corrupted data chunk has been located. If, at step 406, a corrupted chunk has been located and the data scrubber process is unable to recover the data chunk through all known means, the corrupted data chunk is declared on a corrupted chunk list by marking the data chunk's hash value as corrupted (step 408). If other data chunks exist which are remaining to be scanned (step 410), the method 400 returns to scanning the next chunk for inconsistencies or corruption (step 404). If, at step 410, no other data chunks remain to be scanned (step 410), the method ends (step 412).

Returning to step 406, if the instant data chunk being scanned is not determined to have inconsistencies nor be corrupted, the method 400 continues to search for any chunks left to be scanned (step 410). If other data chunks exist which are remaining to be scanned, the method 400 returns to scanning the next chunk for inconsistencies or corruption (step 404). If, at step 410, no other data chunks remain to be scanned (step 410), the method ends (step 412).

Data Adjuster Process

Figure 5:
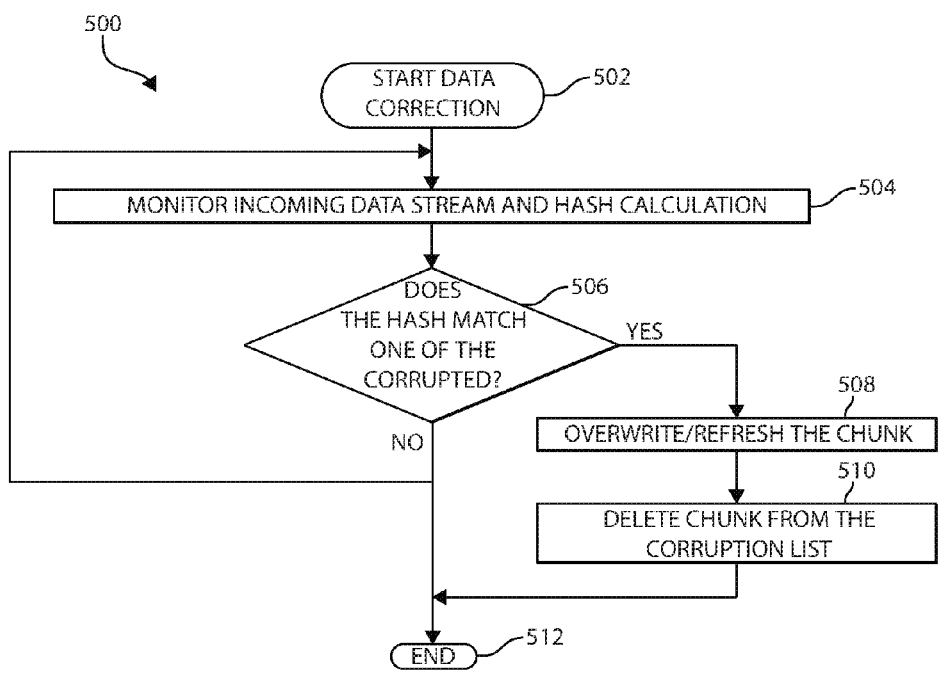
FIG. 5 is still an additional flow chart illustrating a method for managing data integrity in a data deduplication system in accordance with aspects of the present invention.

FIG. 5 illustrates a method 500 for data correction by overwriting corrupted chunks, in accordance with one embodiment of the present invention. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning the data correction (step 502), an incoming data stream into the deduplication system is monitored including each incoming data chunk's hash calculation (step 504). At step 506, a determination is made whether the incoming data chunk's hash value identically matches a hash value of a known corrupted data chunk on the data chunk list. If at step 506, the hash value of the instant incoming data chunk in the data stream does not match a hash value of a known corrupted data chunk on the corrupted chunk list, the method 500 returns to monitoring the incoming data stream and data chunk hash calculations (step 504).

Returning to step 506, if the hash value of the instant incoming data chunk does identically match the hash value of a known corrupted data chunk on the corrupted chunk list, the old, corrupted data chunk is overwritten by the data adjuster with the fresh, good incoming chunk (step 508), and the data chunk is refreshed. The record of the corrupted data chunk is then removed from the corrupted chunk list (step 510), and the method ends (step 512).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data integrity in a data deduplication system, by a processor device, comprising:
   in a data deduplication system using a data scrubber process executing as a daemon, overwriting a stored data chunk declared as corrupted with an identical fresh data chunk discovered in an incoming data stream; wherein the identical fresh data chunk bears an identical hash value as the stored data chunk declared as corrupted;
   initiating the data scrubber process, the data scrubber process iterating through each of a plurality of data chunks to identify corrupted data chunks stored within the data deduplication system; wherein, pursuant to declaring the stored data chunk as corrupted by the data scrubber process, the stored data chunk is attempted to be recovered by the data scrubber process previous to declaring the stored data chunk as corrupted;
   recording a chunk status of the stored data chunk declared as corrupted on a managed chunk list; wherein the managed chunk list identifies each data chunk stored within the data deduplication system using a chunk identification (ID) and records, for each data chunk respectively, the chunk status including listing a valid status, a corrupt status, and a refreshed status subsequent to overwriting the stored data chunk declared as corrupted with the identical fresh data chunk;

monitoring hash value calculations of data chunks in the incoming data stream to discover the identical fresh data chunk; and upon overwriting the stored data chunk declared as corrupted with the fresh data chunk discovered in the incoming data stream, removing the stored data chunk declared as corrupted from the corrupted chunk list.

2. The method of claim 1, wherein declaring the stored data chunk as corrupted further includes marking a hash value of the stored data chunk declared as corrupted as a known corrupted chunk.

3. A system for managing data integrity in a data deduplication system, the system comprising:
at least one processor device, wherein the processor device:
in a data deduplication system using a data scrubber process executing as a daemon, overwrites a stored data chunk declared as corrupted with an identical fresh data chunk discovered in an incoming data stream; wherein the identical fresh data chunk bears an identical hash value as the stored data chunk declared as corrupted;
initiates the data scrubber process, the data scrubber process iterating through each of a plurality of data chunks to identify corrupted data chunks stored within the data deduplication system; wherein, pursuant to declaring the stored data chunk as corrupted by the data scrubber process, the stored data chunk is attempted to be recovered by the data scrubber process previous to declaring the stored data chunk as corrupted;
records a chunk status of the stored data chunk declared as corrupted on a managed chunk list; wherein the managed chunk list identifies each data chunk stored within the data deduplication system using a chunk identification (ID) and records, for each data chunk respectively, the chunk status including listing a valid status, a corrupt status, and a refreshed status subsequent to overwriting the stored data chunk declared as corrupted with the identical fresh data chunk;
monitors hash value calculations of data chunks in the incoming data stream to discover the identical fresh data chunk; and
upon overwriting the stored data chunk declared as corrupted with the fresh data chunk discovered in the incoming data stream, removes the stored data chunk declared as corrupted from the corrupted chunk list.

4. The system of claim 3, wherein the at least one processor device declares the stored data chunk as corrupted by marking a hash value of the stored data chunk declared as corrupted as a known corrupted chunk.

5. A computer program product for managing data integrity in a data deduplication system, by a processor device, the computer program product embodied on a non-transitory computer-readable storage medium having computer-readable program code portions stored therein, the computer-readable program code portions comprising:
an executable portion that in a data deduplication system using a data scrubber process executing as a daemon, overwrites a stored data chunk declared as corrupted with an identical fresh data chunk discovered in an incoming data stream; wherein the identical fresh data chunk bears an identical hash value as the stored data chunk declared as corrupted;
an executable portion that initiates the data scrubber process, the data scrubber process iterating through each of a plurality of data chunks to identify corrupted data chunks stored within the data deduplication system; wherein, pursuant to declaring the stored data chunk as corrupted by the data scrubber process, the stored data chunk is attempted to be recovered by the data scrubber process previous to declaring the stored data chunk as corrupted;
an executable portion that records a chunk status of the stored data chunk declared as corrupted on a managed chunk list; wherein the managed chunk list identifies each data chunk stored within the data deduplication system using a chunk identification (ID) and records, for each data chunk respectively, the chunk status including listing a valid status, a corrupt status, and a refreshed status subsequent to overwriting the stored data chunk declared as corrupted with the identical fresh data chunk;
an executable portion that monitors hash value calculations of data chunks in the incoming data stream to discover the identical fresh data chunk; and
an executable portion that, upon overwriting the stored data chunk declared as corrupted with the fresh data chunk discovered in the incoming data stream, removes the stored data chunk declared as corrupted from the corrupted chunk list.

6. The computer program product of claim 5, further including an executable portion that declares the stored data chunk as corrupted by marking a hash value of the stored data chunk declared as corrupted as a known corrupted chunk.

* * * * *